Oct. 29, 1957 P. W. CRIST 2,811,716
PHASE-RESPONSIVE APPARATUS
Filed May 6, 1949 5 Sheets-Sheet 1

INVENTOR
PHILIP W. CRIST
BY
Paul B. Hunter,
ATTORNEY

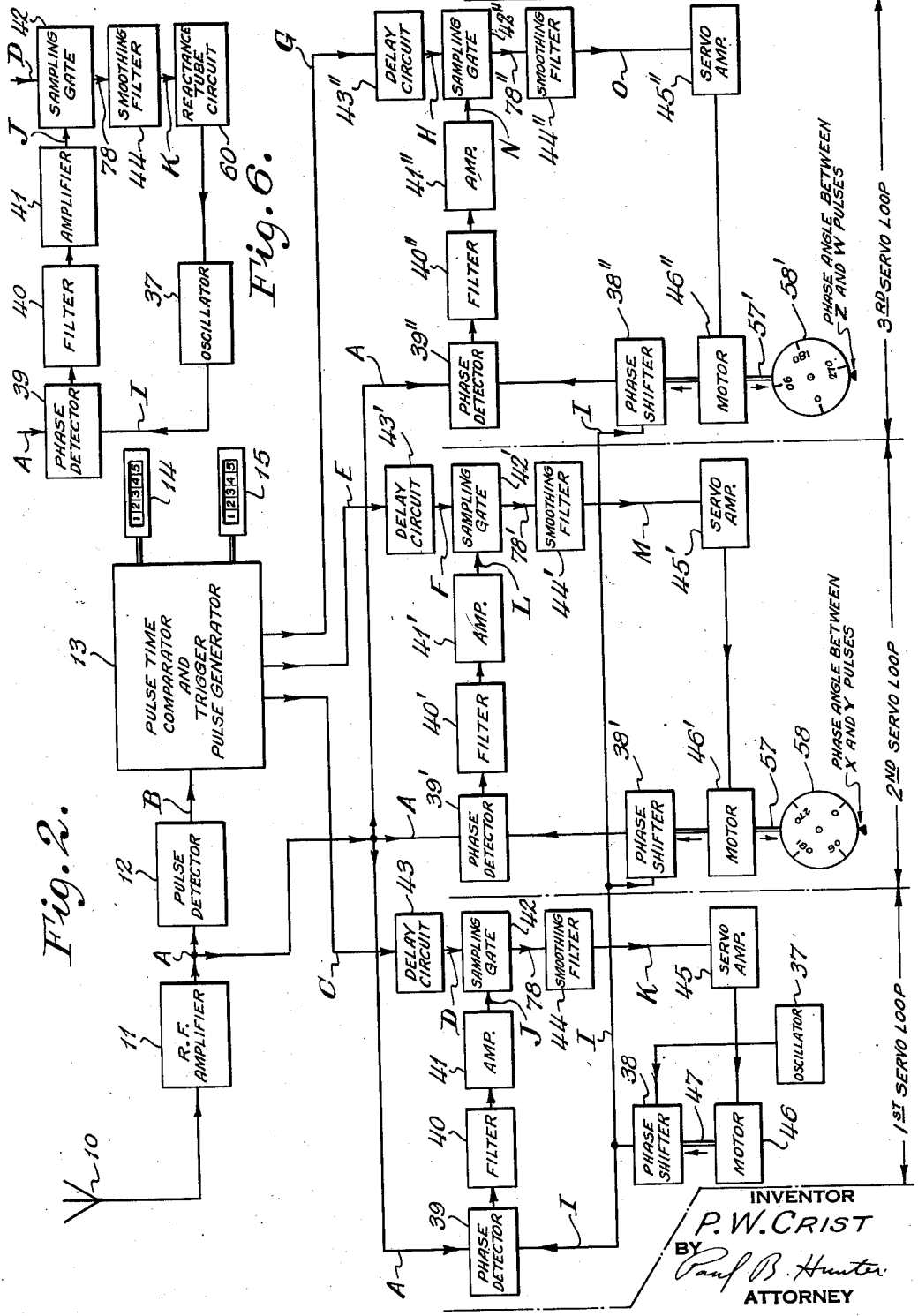

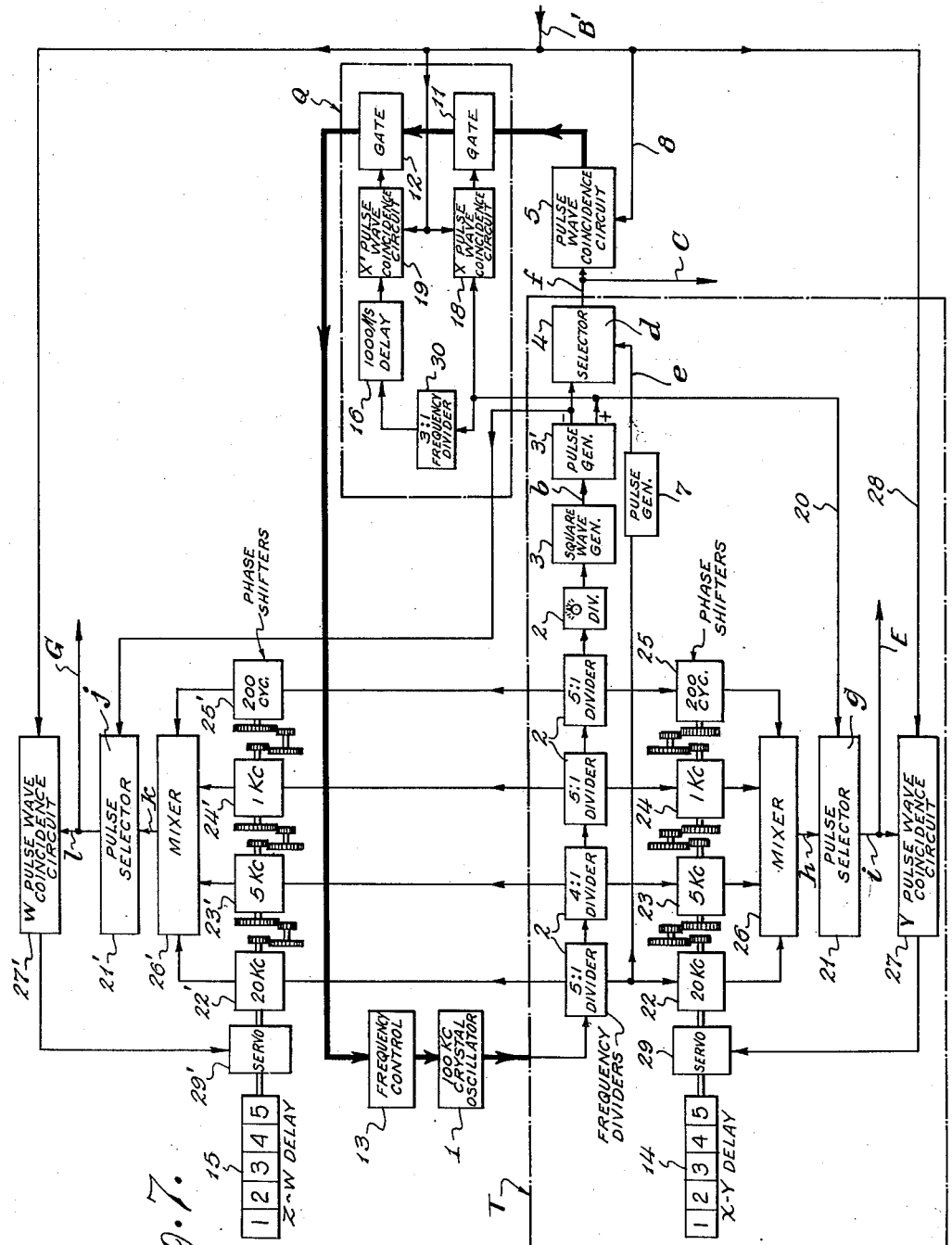

United States Patent Office 2,811,716
Patented Oct. 29, 1957

2,811,716

PHASE-RESPONSIVE APPARATUS

Philip W. Crist, Hempstead, N. Y., assignor to Sperry Rand Corporation, a corporation of Delaware Application May 6, 1949, Serial No. 91,659

13 Claims. (Cl. 343—103)

This invention relates to phase-responsive apparatus and particularly to apparatus for synchronizing the alternating component of recurrent pulses of high frequency energy in fixed phase relation with a continuous high frequency signal.

The present application discloses apparatus for automatically making pulse and phase comparison between the radio frequency cycles comprising the pulses produced by the master and slave stations in a Loran type navigation system, which apparatus is also disclosed in U. S. Patent No. 2,766,450, issued on October 9, 1956 and disclosed and claimed in copending U. S. application Serial No. 577,187, filed on April 6, 1956. Application Serial No. 92,797, filed on May 12, 1949 relates to the phase comparison system disclosed herein, whereas the present application pertains to the sampling gate and synchronization system employed in the apparatus.

The usual method of phase comparison between two high frequency signals is to apply the two signals simultaneously to a phase comparator where an output voltage proportional to the difference in phase between the two signals is produced. It has been found that a phase comparator of this type does not in itself give completely satisfactory results when one of the signals is discontinuous such as the pulses of a Loran system.

When the pulse signals are derived from electromagnetic pulses such as used in a Loran system, a further problem is encountered in that the trailing edges of the pulse signals are often disturbed by sky waves or other interference and in that random noise signals often occur simultaneously with the pulse signals.

It is an object of this invention to provide apparatus for synchronizing a continuous high frequency signal in fixed phase relation to the alternating component of recurrent pulses of high frequency energy.

Another object of this invention is to provide apparatus for measuring the phase relation between the alternating component of recurrent pulses of high frequency energy and a continuous high frequency signal with a high degree of discrimination against random noise and other interference.

Further objects and advantages of the invention will be apparent from the following description, the appended claims and the drawings, in which Fig. 1 is a diagram illustrating principles of Loran navigation;

Fig. 2 shows a preferred embodiment of this invention in block diagrammatic form;

Fig. 6 shows alternative apparatus which may be employed to replace a portion of the apparatus disclosed in Fig. 2;

Fig. 7 shows a suitable pulse time comparator and trigger pulse generator for use in the systems shown in Fig. 2.

According to the present disclosure, receiving apparatus is provided for pulse and radio frequency phase comparison between the pulses produced by a low frequency triad Loran transmitting system in which the phase of the radio frequency cycles produced by the master and slave stations is synchronized.

It will be apparent that the apparatus disclosed herein is equally applicable to standard Loran transmitting systems provided the phase of the radio frequency cycles produced by the master and slave stations is synchronized.

According to this invention, phase comparison is accomplished by applying the radio frequency pulses produced by the Loran transmitting system and a continuous high frequency signal produced by a local oscillator to a phase detector. A sampled portion of the phase detector output voltage is employed in a first servo loop to lock the phase of the output of the local oscillator to the phase of the master pulses of the Loran transmitting system. A second servo loop which is similar to the first is employed to actuate a phase shifter and lock the phase of the continuous signal produced by the first servo loop and the phase shifter to the phase of the pulses produced by one slave station of the Loran transmitting system, and the phase difference between the master and slave pulses is shown on an indicator attached to the shaft of the phase shifter of the second servo loop. A third servo loop identical to the second loop is employed to measure the phase difference between the master pulses and the pulses produced by the other slave station of the Loran transmitting system.

Figure 1:
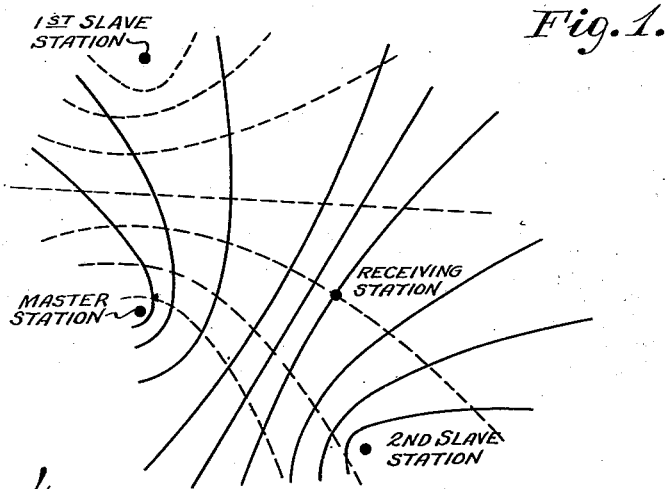

Fig. 1 is a diagram which illustrates the principles of a low frequency triad Loran navigation system. There are three transmitters—the master station, the first slave station and the second slave station—suitably placed so that the transmission pattern of each station covers the region which the system serves.

The master station radiates pulses X and Z separated by fixed intervals of time and at a fixed repetition rate as indicated in Fig. 3A. In order to identify the pulses, an X' pulse is provided which is merely the X pulse delayed a brief interval of time, such as one thousand microseconds, every third recurrence period. One of the slave stations, the first for example, radiates a pulse Y at a fixed time after each X pulse, and the other slave station radiates a pulse W at a fixed time after each Z pulse.

For use with the receiving apparatus disclosed herein, the radio frequency cycles comprising the pulses emitted by each slave station must have a fixed phase relation to the radio frequency cycles comprising the pulses emitted by the master station. The receiving station receives the respective pulses at times depending upon the distance between the receiving station and the respective transmitters and the time relationships between the master and slave pulses.

Each hyperbolic curve indicated by a solid line in Fig. 1 shows the locus of receiving points at which the time delay between master pulses Z and slave pulses W is constant. Each hyperbolic curve indicated by a dashed line shows the locus of receiving points at which the time delay between the master pulses X and slave pulses Y is constant.

Thus, the time delay between the Z and W pulses and between the X and Y pulses at a receiving station located within the radiation pattern of the three transmitters serves to determine two hyperbolic curves on which the receiving station is located. The intersection of the two hyperbolic curves determines the point at which the receiving station is situated.

The time relationship between the master and slave pulses is such that the X pulses are received prior to the Y pulses and the Z pulses are received prior to the W pulses at any receiving point within the region which the system serves. Also, the time relationship is such that at any receiving point within the region which this system serves, the Y pulses are received only during the interval of time between the X and Z pulses and the W pulses are received only during the interval of time between the Z and X pulses. Thus, the sequence of the signals which occur at the receiving point during each recurrence period is X, Y, Z, W as indicated in Fig. 3A.

In the idealized example illustrated by the curves of Fig. 3A the master pulses X, X' and Z and slave pulses W are not affected by interference; however, the trailing edge of each slave pulse Y is affected by sky wave interference. This example of the received wave forms could correspond to the station locations indicated in Fig. 1, wherein the receiving station is between the master and the second slave station and distant from the first slave station. It has been found that sky wave interference, when present, is delayed 50 microseconds or more with reference to the direct wave. As will be explained hereafter, such interference during either the slave or master pulses has no adverse effect on the apparatus disclosed herein.

Figure 3:
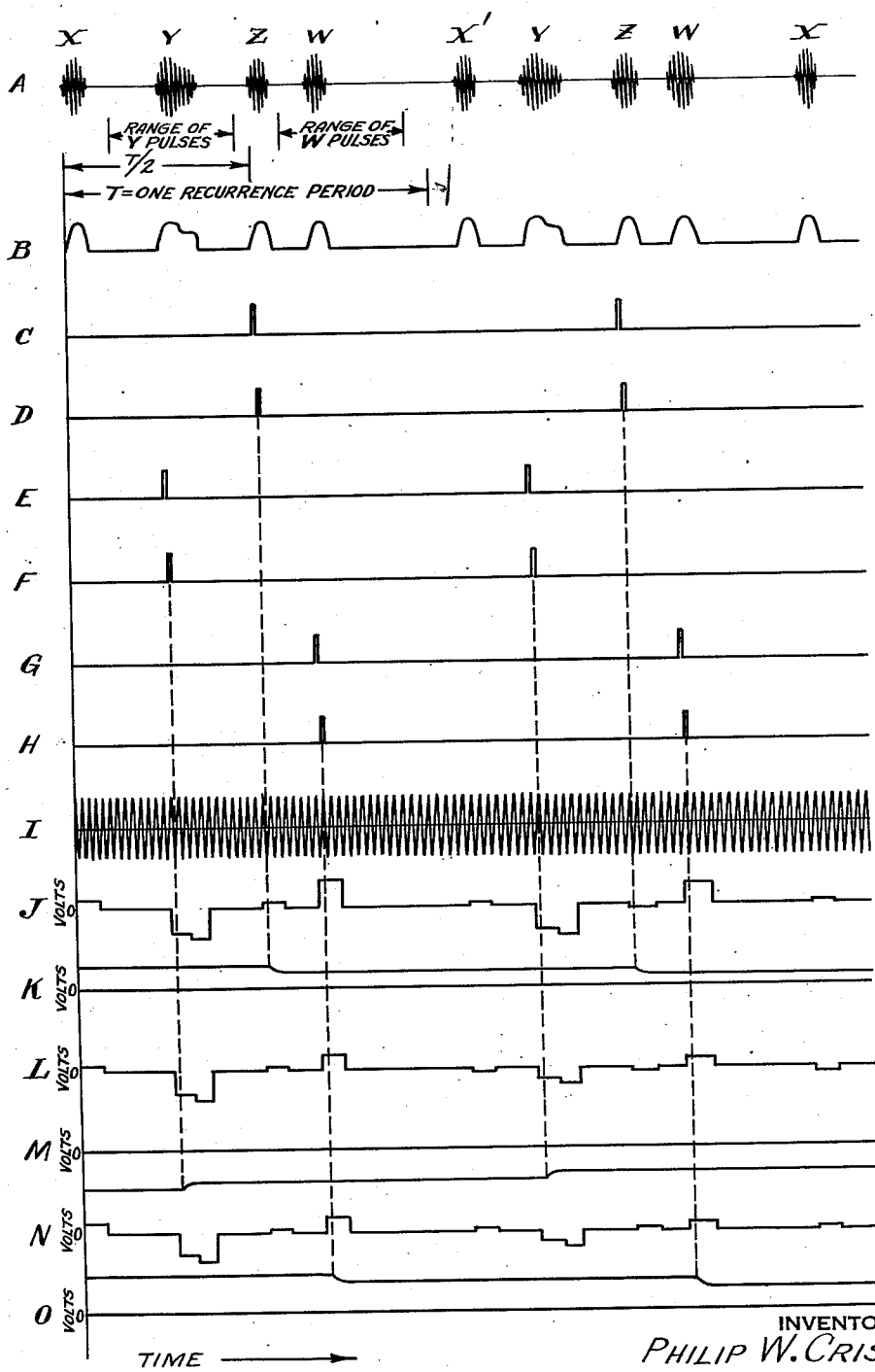
Fig. 3 shows the wave form of and time relations among various signals generated by the apparatus disclosed in Fig. 2.

Referring now to Figs. 2 and 3, it will be observed that each of the letters A to O which identifies a curve in Fig. 3 representing the wave form of a signal is also employed to designate the conductor in Fig. 2 which carries the corresponding signal.

Antenna 10 is located at the receiving point and is connected to radio frequency amplifier 11. Conductor A connects the amplified radio frequency pulses to pulse detector 12 which is a conventional amplitude detector and which serves to produce signals B representing the amplitude of the master and slave pulses. The output B of pulse detector 12 is connected to pulse time comparator and trigger pulse generator 13 which serves to automatically measure the interval of time between the X—Y and Z—W pulses, and the two time intervals are registered on indicators 14 and 15, respectively.

Figure 8:
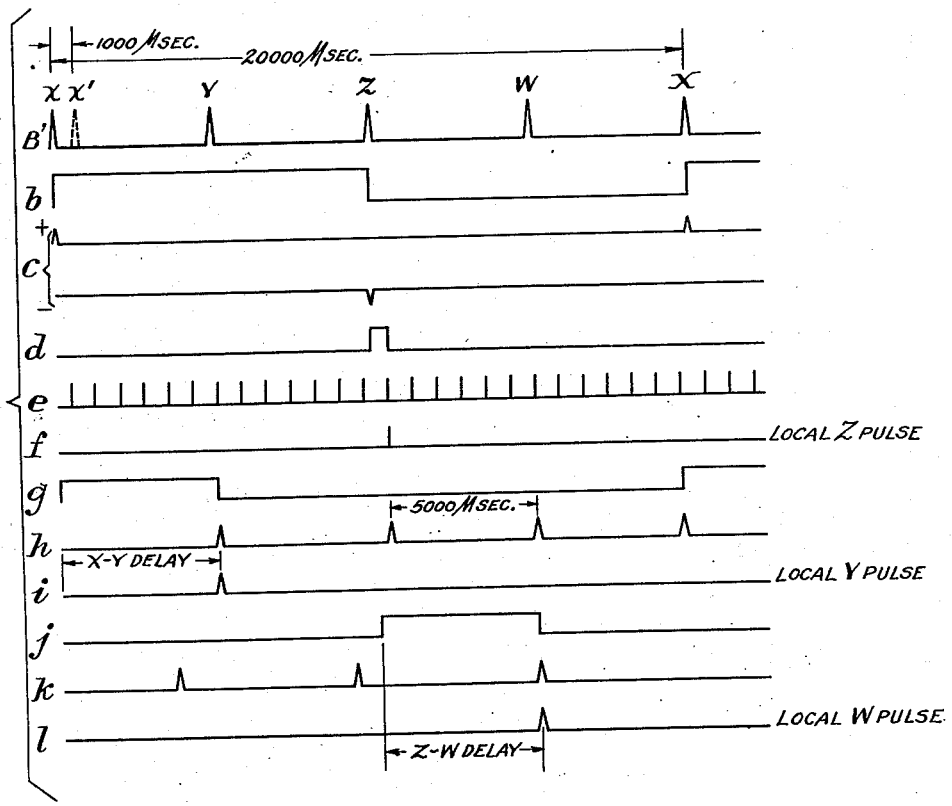
Fig. 8 is a group of wave forms illustrative of the operation of Fig. 7.

For a description of such a pulse time comparator and trigger pulse generator, reference is made to Figs. 7 and 8, Fig. 8 being illustrative of the operation of Fig. 7 and keyed to the circuit of Fig. 7 by identifying letters. The time scales of Fig. 8 have been somewhat exaggerated in some cases because of space considerations.

In Fig. 7 a stable 100 kc. oscillator 1 drives a chain of frequency dividers 2, the outputs of which are connected to a direct reading phase delay measuring system T. The frequency dividers 2 and the phase delay measuring system may be the same type as disclosed in my copending application for Timing Apparatus, Serial No. 633,473, filed December 7, 1945, now Patent No. 2,731,634 issued Jan. 17, 1956.

The lowest frequency generated by the frequency dividers 2 drives square wave generator 3 which may be an Eccles Jordon circuit operating at the Loran repetition frequency, for instance 50 C. P. S. The last divider may be adjustable without disturbing the timing accuracy. Pulse generator 3' creates positive and negative pulses (Fig. 8c) in response to the square wave (Fig. 8b), and for proper operation they must be synchronized with the X pulse, as illustrated in Fig. 8. The negative pulses from pulse generator 3 are arranged to trigger "on" a pulse selector 4 which may be a "one shot" multivibrator, having a wave form (Fig. 8d) which is arranged to be triggered "off" by the next following timing pulse (Fig. 8e) received from frequency divider 2 and pulse generator 7. Selector 4 is arranged to have a pulse output (Fig. 8f) at the trailing edge of wave form (Fig. 8d), thus effectively selecting one of the timing pulses (Fig. 8e). This "selected" locally generated timing pulse (Fig. 8f) which is the locally generated Z pulse is then applied to a discriminator or pulse wave coincidence circuit 5 containing a multi-grid vacuum tube. Such circuits are well known in the art, a suitable one being described in detail in Fig. 4 of applicant's copending application 80,249, filed March 8, 1949.

The incoming detected Loran pulses on lead B' are applied over lead 8 in Fig. 7 also to pulse wave coincidence circuit 5, so that coincidence between local Z trigger pulse (Fig. 8f) from the selector 4, and an incoming Loran Z pulse, generates a bias which is applied through gate circuits 11 and 12 to frequency controller 13 which controls the frequency of oscillator 1.

The operation of relay or gate circuits 11 and 12 is arranged to insure the synchronization of local and received pulses in the proper sequence. The circuits through gates 11 and 12 will be completed when the positive local X pulses (Fig. 8c) and received X pulses coincide in detector 18, and the local X' pulses and received X' pulses coincide in detector 19. This is done in the following manner: The positive pulses of Fig. 8c from generator 3' are applied to a second pulse wave coincidence circuit 18. Referring to Fig. 8 it will be seen that this positive trigger (Fig. 8c) is exactly one-half of a Loran cycle after the negative trigger (Fig. 8c) pulse, applied to wave coincidence circuit 5. Therefore, if coincidence circuit 5 synchronizes with the Z pulse then the coincidence circuit 18 will synchronize with the X pulse.

In order to insure that coincidence circuit 5 synchronizes with the Z pulse without ambiguity, use is made of the ghost pulse X' which occurs, for instance, every third cycle when the X pulse is displaced one thousand microseconds. The positive pulse (Fig. 8c) from generator 3' is applied through a 3:1 frequency divider 30 and a 1,000 microsecond delay circuit 16 to a third coincidence circuit 19 which is similar to coincidence circuit 18. This locally generated X' pulse will synchronize in detector 19 with the ghost X' pulse and complete the circuit through gate 12.

In the absence of a synchronization signal, oscillator 1, is adjusted so that the locally generated pulses will have a slightly lower frequency and will drift relative to the incoming pulses until synchronization in the proper sequence is established. The rate of drift may be adjusted by presetting the oscillator 1.

Therefore, referring to Fig. 8 it will be seen that only synchronization in the proper sequence of the pulses, local and incoming, X and X' will complete the circuits through gates 11 and 12. These sequence testing circuits apply the synchronizing frequency control voltage from coincidence circuit 5 to oscillator 1 to thereby lock in the local pulses with the incoming pulses.

The time measurement between the X and Y pulses (Fig. 8h) is made by generating a local Y pulse delayed a measurable amount from the local X pulse, so that it synchronizes with the incoming Loran Y pulse. The delay technique and apparatus is generally the same as described more fully in my aforementioned application Serial No. 633,473 for Timing Apparatus. It is done as follows: The positive pulses (Fig. 8c) from generator 3' are applied on lead 20, and trigger "on," pulse selector 21, which may be a "one shot" multivibrator similar to selector 4 and having a wave form (Fig. 8g). Selector 21 is arranged to be triggered "off" by the next occurring locally generated delayed pulse (Fig. 8h) from mixer 26. This delay is accomplished by the geared phase shifters 22, 23, 24 and 25. The phase shifter outputs are combined in mixer 26 and trigger "off" the pulse selector 21. Therefore, the selected pulse of Fig. 8h is the local Y pulse (Fig. 8i).

A suitable arrangement of the phase shifters and delay indicator 14 is given in my aforementioned application Serial No. 633,473. Generally selsyn units may be used as phase shifters and their output coils may be connected in series to mix the various frequency waves. Mixer 26 preferably has a pulse sharpening output stage to produce the pulses (Fig. 8h). The gear ratios between the phase shifters is proportional to the frequencies, so that the accuracy of the indicated phase delay reading is proportional to the highest frequency, and cyclic ambiguity at the frequency is resolved by the lower frequencies. An arrangement for producing a timing pulse from a group of phase shifted waves is disclosed in my copending application Serial No. 732,243, filed March 4, 1947 for a Phase Shift Timer.

The locally generated Y pulse (Fig. 8i) is applied to Y pulse wave coincidence circuit 27. If the locally generated Y pulse is not in synchronism with the Y pulse received over lead 28 from radio frequency receiver 6, then the pulse wave coincidence discriminator 27 will generate an error signal which operates servo 29 to adjust the phase shifters until the locally generated Y pulse and the received Y pulse are in synchronism. The total phase delay as read on calibrated indicator 14 then gives the desired Loran time delay between the X and the Y pulses indicated in Fig. 8h. The pulse wave coincidence circuit, as mentioned with respect to 5 above, may be used for all the discriminators 5, 18, 19, 27 and 27' of Fig. 7. Indicator 14 may be a Veeder type counter geared to the phase shifters.

The Z—W time delay is measured in the same way by means of the parallel time measuring circuits comprising phase shifters 22' to 25', mixer 26', pulse selector 21', discriminator 27', servo 29' and indicator 15. These circuits operate in the same manner as described for the measurement of the X—Y delay.

The W selector 21' is triggered "on" by the negative pulses (Fig. 8c), from pulst generator 3', and is triggered "off" by the next succeeding pulse (Fig. 8k) from mixer 26'. Pulse selector 21' may be a one-shot multivibrator having a wave form (Fig. 8j) plus means for providing a pulse at the trailing edge of the multivibrator wave form, the same as pulse selectors 4 and 21. The selected pulse is the locally generated W pulse (Fig. 8l). The local and incoming W pulses are compared in pulse wave coincidence circuit 27', which drives the delay phase shifters by means of servo 29' to provide the Z—W delay on indicator 15.

It will be noted that the leads C, E, and G of Fig. 7 correspond in function with the similarly lettered leads in Fig. 2.

For an even more detailed explanation of the pulse time comparator and trigger pulse generator further reference is made to applicant's above mentioned copending application No. 80,249.

Referring again to Figs. 2 and 3 the two intervals of time registered on indicators 14 and 15 may be employed to determine the two hyperbolic curves at whose intersection the receiving station is located. However, the accuracy obtained by pulse comparison alone is not sufficiently high for certain high-precision navigation requirements, and measurement of the radio frequency phase relation between the X—Y and Z—W pulses is resorted to in order to obtain extremely high accuracy in determining the position of the receiving station. Three servo loops, which will be discussed in detail below, operate in conjunction with pulse time comparator and trigger pulse generator 13 to measure the phase relation between the master and slave pulses.

Pulse time comparator 13 serves to generate three series of trigger pulses as follows: pulses C of the same periodicity as and coincident with master pulses Z, pulses E of the same periodicity as and coincident with slave pulses Y, and pulses G of the same periodicity as and coincident with slave pulses W, each pulse appearing respectively on leads C, E, and G as shown in Figs. 2 and 7.

Each of the trigger pulses C, E and G occurs when the pulse envelopes B of the respective Z, Y and W pulses attain a predetermined amplitude which is low compared to their peak amplitudes and hence close to their leading edges.

Oscillator 37 is a standard oscillator of high frequency stability which may be tuned within the frequency range of the master transmitting station.

The output of oscillator 37 is applied to the first servo loop through a conventional phase shifter 38 and the phase-shifted output I of phase shifter 38 is applied to phase detector 39.

Phase detector 39 may be a conventional type such as disclosed in Patent No. 2,256,487, granted to F. L. Moseley et al. on September 23, 1941, and it is adapted to produce a voltage proportional to the cosine of the phase angle between the two waves which are compared. A full-wave phase detector is preferable because distortions due to second order harmonics are minimized in such a detector. However, a conventional half-wave detector is satisfactory. The output A of radio frequency amplifier 11 is connected to phase detector 39 where the alternating component of each of pulses A is compared with the phase-shifted signal I of local oscillator 37. The output of phase detector 39 is applied to filter 40 which serves to filter out the radio frequency components in the output of the phase detector. The output of filter 40 is applied to a conventional amplifier 41 and the output J of amplifier 41 is applied to sampling gate 42.

Output C of pulse time comparator and trigger pulse generator 13 is connected to delay circuit 43 and the output D of delay circuit 43 is applied to sampling gate 42.

Delay circuit 43 serves to delay pulses C so that each pulse D occurs coincident in time with the leading edge of the corresponding master pulse Z at a time at which the radio frequency cycles of the master pulses Z have attained appreciable magnitude but at a time prior to the occurrence of sky wave interference. Since each pulse C produced by pulse time comparator and trigger pulse generator 13 is caused to occur a very short time after the corresponding master pulse Z is initiated, it is desirable to cause the delayed pulses D to occur a short interval of time thereafter so that each pulse D will actuate sampling gate 42 at a time when the output of phase detector 39 is stable.

Sampling gate 42, which will be discussed in detail with reference to Figs. 4 and 5, serves to sample the output J of amplifier 41 during a period of time approximately equal to the time required for two cycles of the radio frequency component of master pulses Z, and the output voltage of sampling gate 42 tends to equal the output J of amplifier 41 during each sampling period. The output voltage of sampling gate 42 is maintained substantially constant between each sampling period.

The output of sampling gate 42 is applied over lead 78 to smoothing filter 44 which has a large time constant and serves to bypass noise components. The time constant of filter 44 is such that the servo system will not oscillate. Filter 44 may be a large capacitance and a small resistance serially connected across the output of sampling gate 42, for example.

The output K of smoothing filter 44 is connected to servo amplifier 45 which in turn is connected to motor 46. The shaft 47 of motor 46 serves to actuate phase shifter 38 in such a manner that the output I of phase shifter 38 tends to maintain a 90° phase relation with the radio frequency cycles of master pulses Z produced by amplifier 11.

Phase shifter 38′, phase detector 39′, generator 40′, amplifier 41′, sampling gate 42′, delay circuit 43′, smoothing filter 44′, servo amplifier 45′ and motor 46′ are identical with elements 38 through 46 respectively. Shaft 47 serves to connect motor 46′ with phase shifter 38′ and in addition is connected to indicator 58. Elements 38′ through 46′, and 57 comprise the second servo loop.

The phase-shifted output I of oscillator 37 provided through phase shifter 38 is applied to the second servo loop through phase shifter 38′, and the output of this phase shifter is in turn applied to phase detector 39′. The output A of radio frequency amplifier 11 is also applied to phase detector 39′ and the detector serves to produce a voltage proportional to the cosine of the phase angle between the output of phase shifter 38′ and the radio frequency cycles of pulses A.

Pulses E derived from pulse time comparator and trigger pulse generator 13 are applied to delay circuit 43′, and delayed pulses F produced by delay circuit 43′ are applied to sampling gate 42′ so that the output L of amplifier 41′ is sampled during the initial portion of each slave pulse Y.

The function of the second servo system is to cause the output of phase shifter 38′ to tend to occur in 90° phase relation with the radio frequency cycles of slave station Y. Thus, indicator 58 serves to indicate the phase relation between the radio frequency cycles of master pulses Z and slave pulses Y. Since master pulses X and Z are produced by the same Loran transmitter, it follows that a phase comparison between the Z and Y pulses is equivalent to a phase comparison between the X and Y pulses. Therefore, indicator 58 serves to indicate the phase relation between the X and Y pulses.

The circuit elements of the third servo loop comprising circuit elements 38″ through 46″, 57′ and 58′ are identical with the corresponding circuit elements of the second servo loop.

Pulses G produced by pulse time comparator and trigger pulse generator 13 are applied to sampling gate 42″ through delay circuit 43″, and the delayed pulses H produced by delay circuit 43″ serve to actuate sampling gate 42″ during the initial portion of each slave pulse W. Thus, the third servo loop tends to cause the output of phase shifter 38″ to occur in 90° phase relation with slave pulses W and indicator 58′ serves to indicate the phase relation between the radio frequency cycles of master pulses Z and slave pulses W.

An alternative arrangement for controlling local oscillator 37 is shown in Fig. 6. In this embodiment of the invention, servo amplifier 45, motor 46 and phase shifter 38 are replaced by a conventional reactance tube circuit 60. Smoothing filter 44 is connected to reactance tube circuit 60 by conductor K, and the output of reactance tube circuit 60 is applied to the frequency control circuit of oscillator 37 so as to control the frequency of oscillations produced thereby, and it tends to cause the output I of oscillator 37 to occur in 90° phase relation with the radio frequency components of the master pulses Z produced by radio frequency amplifier 11.

A servo loop of the type shown in Fig. 6 may be employed to replace each of the three servo loops shown in Fig. 1. With such an arrangement, the conductor I connecting the second and third servo loops to the first is omitted, and the phase relation between the continuous high frequency signals produced by the three oscillators is measured by connecting a conventional phase angle indicator such as disclosed in U. S. Patent No. 2,370,692, granted to J. E. Shepherd on March 6, 1945, to the outputs of the local oscillators in the first and second servo loops and connecting a second phase angle indicator to the outputs of the local oscillators in the first and third servo loops.

In operation, antenna 10 serves to intercept portions of the pulses of electromagnetic energy produced by the Loran transmitting system, and serves as a source of recurrent high frequency signals or pulses for the phase comparator apparatus. These pulses are amplified and applied to the three phase detectors 39, 39′ and 39″. The amplified pulses A are compared in phase detector 39 with the output I of phase shifter 38, and voltage pulses J are produced. Each voltage pulse J is proportional to the phase angle between the radio frequency cycles in the respective pulse A and signal I.

Voltage pulses J are applied to sampling gate 42 and pulses C serve to actuate sampling gate 42 for a short time during an early part of each of the master pulses Z so that the output K which results from the action of sampling gate 42 and filter 44 is a voltage which tends to be of equal magnitude and polarity to the voltage pulses J which occur during each sampling period. This voltage is maintained substantially constant during the time interval between successive sampling periods.

This voltage K serves to cause motor 46 to rotate as required to maintain substantially a 90° phase relation between the radio frequency cycles of master pulses Z and the output of phase shifter 38.

Oscillator 37 is adjusted so that the rotation of motor 46 is minimized. If oscillator 37 is adjusted so that the frequency of the signal produced thereby is exactly the same as the frequency of master pulses Z, motor 46 is not caused to rotate after synchronism is established provided there is no relative movement between the receiving and master stations which changes the distance between the two stations. However, if oscillator 37 operates at a slightly different frequency from the frequency of the master station or if the distance between the receiving and master stations is continuously changed, motor 46 causes shaft 47 to move continuously in order to provide a net effect corresponding to a change in frequency of oscillator 37 and cause the frequency of signal I to be equal to the frequency of the master pulses Z.

Signal I is applied to phase shifter 38′ of the second servo loop and pulses F serve to actuate sampling gate 42′ during the leading edge of each of the slave pulses Y. The voltage M produced by the combined action of sampling gate 42′ and smoothing filter 44′ serves to cause motor 46′ to rotate so that phase shifter 38′ is caused to assume a position which tends to cause the output of phase shifter 38′ to maintain a 90° phase relation with slave pulses Y.

In the same manner pulses H actuate the third servo loop so that phase shifter 38″ is caused to assume a position which tends to cause the output of phase shifter 38″ to maintain a 90° phase relation with slave pulses W.

Thus, indicator 58 continuously shows the phase relation between the radio frequency cycles of master pulses X and slave pulses Y and indicator 58′ continuously shows the phase relation between the radio frequency cycles of master pulses Z and slave pulses W.

To determine the position of the receiving station, the time registered on indicators 14 and 15 is corrected by the times corresponding to the phase angles indicated on indicators 58 and 58' respectively. The two corrected times are precise measurements of the time delay between the X and Y and between the Z and W pulses. These two delay times are then employed to determine the two hyperbolic curves upon which the receiving station is located. The point at which the two curves intersect determines the position of the receiving station with respect to the three Loran transmitters with a very high degree of accuracy.

Since trigger pulses D, F and H occur during the initial portions of pulses Z, Y and W respectively, it follows that the brief periods during which the signals J, L and N are sampled are free from the effect of sky wave interference.

Since trigger pulses D, F and H occur at the time when the respective Z, Y and W pulse envelopes shown in Fig. 3B attain the same amplitude, it follows that trigger pulses D, F and H each occur at times during the respective Z, Y and W radio frequency pulses shown in Fig. 3A at which an equal number of radio frequency cycles have occurred. Sampling gates 42, 42' and 42" are actuated during intervals of time approximately equal to two radio frequency cycles at the operating frequency; therefore, phase comparison is effected between pulses X and Y and between pulses Z and W at corresponding cycles during the respective pulses.

Figure 4:
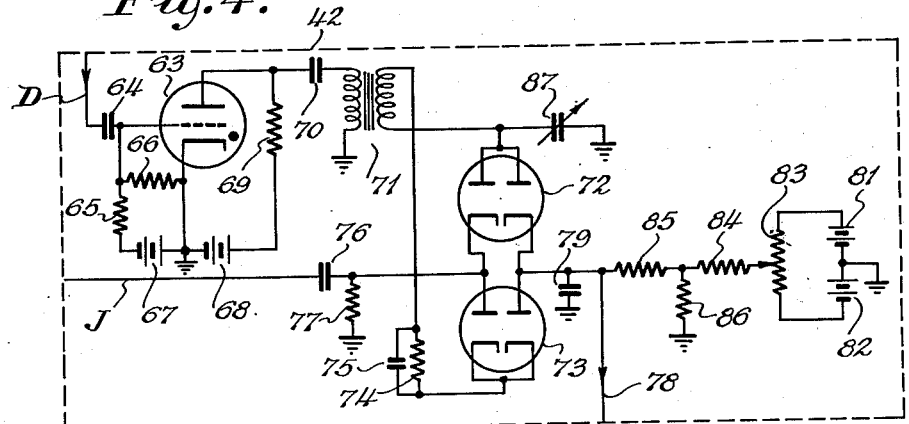
Fig. 4 shows a schematic diagram of a suitable sampling gate shown in block diagrammatic form in Fig. 2.

Fig. 4 shows a suitable sampling gate of a type which may be used as elements 42, 42' and 42" in the apparatus shown in Fig. 2. The following description relates to use of such a sampling gate as element 42.

Pulses D are applied to the control grid of gas tube 63 through condenser 64. Resistors 65 and 66 are serially connected across battery 67, and the junction between the resistors is connected to the control grid of tube 63 to bias the tube to cutoff. Battery 68 and resistor 69 are connected between the plate and cathode of tube 63 and serve to supply the plate current for the tube. The plate of tube 63 is connected through condenser 70 and the primary winding of pulse transformer 71 to ground. Transformer 71 is a pulse type adapted to produce a pulse of suitable duration.

The plates of twin diode tube 72 are connected in parallel and are connected to the parallel connected cathodes of twin diode tube 73 through the secondary of transformer 71 and the parallel combination of resistor 74 and condenser 75. Resistor 74 and condenser 75 form a high time-constant network.

One cathode of tube 72 and one plate of tube 73 are connected together and signal J is applied thereto through condenser 76. Resistor 77 is connected between condenser 76 and ground.

The other cathode of tube 72 and the other plate of tube 73 are also connected together, and lead 78 connected thereto connects sampling gate 42 to smoothing filter 44. Condenser 79 serves to maintain the output of the sampling gate substantially constant during the intervals between each sampling period.

Batteries 81 and 82 are connected in series across potentiometer 83, and the junction between the two batteries is grounded. The rotor of potentiometer 83 is connected to lead 78 through resistors 84 and 85. Resistor 86 is connected between the junction between resistors 84 and 85 and ground.

Variable condenser 87 is connected between the plates of tube 72 and ground to permit balancing of transients between tubes 72 and 73. Potentiometer 83 serves as a means for counteracting the leakage current that flows through tubes 72 and 73. To adjust condenser 87 and potentiometer 83, lead J is grounded and signal D is applied to the sampling gate and then condenser 87 and potentiometer 83 are adjusted until no voltage appears between lead 78 and ground.

Suitable values for the circuit constants shown in Fig. 4 employed with a type 6D4 gas tube and type 6AL5 twin diode tubes adapted to actuate the sampling gate for 10 microsecond intervals of time in response to each pulse D are as follows:

| | |
|---|---|
| C64 | 22 micromicrofarads. |
| C70 | 0.01 microfarad. |
| C75 | 0.1 microfarad. |
| C76 | 0.1 microfarad. |
| C79 | 0.1 microfarad. |
| C87 | 5–50 micromicrofarads. |
| R65 | 820,000 ohms. |
| R66 | 330,000 ohms |
| R69 | 330,000 ohms |
| R74 | 10 megohms. |
| R77 | 47,000 ohms. |
| R83 | 500,000 ohms. |
| R84 | 1 megohm. |
| R85 | 10 megohms. |
| R86 | 47,000 ohms. |
| Battery 67 | 105 volts. |
| Battery 68 | 120 volts. |
| Battery 81 | 120 volts. |
| Battery 82 | 105 volts. |

In operation, the initial portions of signal J have no effect on the conducting condition of tubes 72 and 73 and therefore the voltage appearing on lead 78 is not affected. When each pulse D is applied to the grid of gas tube 63 the tube becomes conducting and a surge of current flows from condenser 70 through the primary of transformer 71 and the interelectrode space between the cathode and plate of tube 63.

The secondary of transformer 71 is connected across tubes 72 and 73 through resistor 74 and condenser 75 so that the voltage pulse causes the plates of tube 72 to be of positive polarity with respect to the cathodes of tube 73; therefore, a surge of current flows through each diode section of tubes 72 and 73 and the tubes form a low impedance path between conductor J and lead 78.

Since resistor 74 and condenser 75 form a high time-constant network, each surge of current which flows through resistor 74 places a charge on condenser 75 and the charge decays slightly between pulses. This charge causes a voltage to appear across condenser 75 which is of a magnitude slightly less than the voltage which appears across the secondary of transformer 71 during each pulse, and this voltage serves to cause the plates of tube 72 to be of negative polarity with respect to the cathode of tube 73 during the time intervals between pulses D, thereby causing tubes 72 and 73 to become nonconducting and offer a very high impedance during the time intervals between pulses D.

The grid and plate voltages applied to gas tube 63 are proportioned so that the flow of current through tube 63 is extinguished after the occurrence of each pulse D.

Thus, each pulse D causes a pulse of current to flow through each diode section of tubes 72 and 73, thereby causing the diode sections to offer a low impedance to signal J during each pulse D. In this manner signal J is sampled during each pulse D, and the voltage which appears on lead 78 during each sampling period tends to equal the voltage of signal J during the sampling period.

The shunt impedance of the leakage current balancing arrangement comprising batteries 81 and 82, potentiometer 83, and resistors 84, 85 and 86 connected to lead 78 is large; therefore, the balancing arrangement has a negligible effect on the voltage appearing on lead 78.

Figure 5:
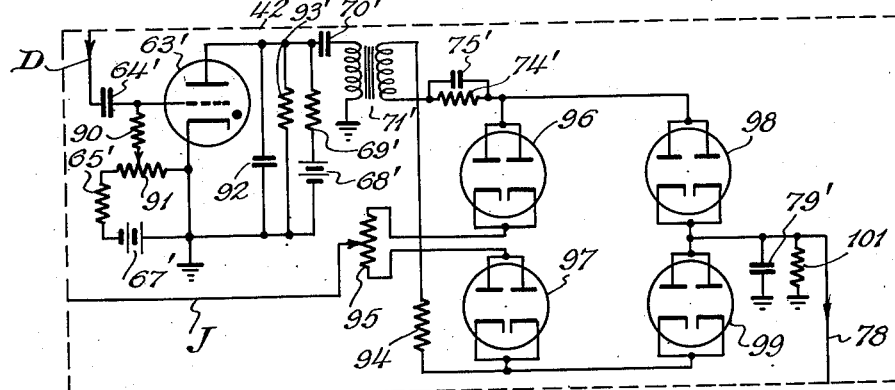
Fig. 5 shows a schematic diagram of an alternative sampling gate.

Fig. 5 shows an alternative sampling gate 42 employing four twin diodes. In this embodiment of the invention bias for gas tube 63' is supplied through resistor 90 by the voltage divider comprising resistor 65' and potentiometer 91 connected across battery 67'. Condenser 92 and resistor 93 serve as a wave shaping network across the primary of transformer 71'. Resistor 94 serves to make the voltage which appears across condenser 75' during each pulse D appreciably less than the voltage which appears across the secondary of transformer 71' during each pulse D.

Potentiometer 95 serves to balance the sampling gate circuit so that an equal current flows through tubes 96, 97, 98 and 99 during each sampling period. To adjust the apparatus so that equal currents flow through tubes 96, 97, 98 and 99, lead J is grounded and signal D is applied to the sampling gate and then potentiometer 95 is adjusted until no voltage appears between lead 78 and ground. To minimize leakage currents a separate filament supply should be provided for each tube. Resistor 101 connected between lead 78 and ground serves to minimize the effect of the leakage current which does flow.

Suitable values for the circuit constants shown in Fig. 5 employed with a 6D4 gas tube and 6AL5 twin diode tubes adapted to actuate the sampling gate for 10 microsecond intervals of time in response to each pulse D are as follows:

| | |
|---|---|
| C64' | 100 micromicrofarads. |
| C70' | 5100 micromicrofarads. |
| C75' | 0.04 microfarad. |
| C79' | 0.02 microfarad. |
| C92 | 220 micromicrofarads. |
| R65' | 75,000 ohms. |
| R69' | 200,000 ohms. |
| R74 | 10 megohms. |
| R90 | 200,000 ohms. |
| R91 | 50,000 ohms. |
| R93 | 100,000 ohms. |
| R94 | 910 ohms. |
| R95 | 50 ohms. |
| R101 | 10 megohms. |
| Battery 67' | 105 volts. |
| Battery 68' | 200 volts. |

Since many changes could be made in the above construction and many apparently widely different embodiments of this invention could be made without departing from the scope thereof, it is intended that all matter contained in the above description or shown in the accompanying drawings shall be interrupted as illustrative and not in a limiting sense.

What is claimed is:

1. In combination, a source of recurrent pulse trains of alternating high frequency signals, means for producing a continuous alternating high frequency signal, means for phase-shifting said continuous signal, a phase detector responsive to said phase-shifted signal and said recurrent signals for producing an output voltage varying according to the phase relation between the alternating components of said recurrent high frequency signals and said continuous high frequency signal, sampling means connected to said phase detector for producing a voltage proportional to the voltage produced by said phase detector, means for deactivating said sampling means except at predetermined intervals of time during predetermined signals of said recurrent signals, and means responsive to the voltage produced by said sampling means for actuating said phase-shifting means and causing said phase-shifted signal to occur in predetermined phase relation to the high frequency components of said recurrent signals.

2. In combination, a source of discontinuous pulse trains of high frequency alternating signals, an oscillator for producing a continuous high frequency signal at substantially the same frequency as the frequency of said discontinuous signals, a phase detector responsive to said discontinuous and said continuous signals for producing a direct current output voltage according to the phase relation between the alternating components of said discontinuous high frequency signals and said continuous high frequency signal, sampling means connected to said phase detector for producing a voltage proportional to the direct current voltage produced by said phase detector during each sampling period, means responsive to said discontinuous signals for deactivating said sampling means except at predetermined intervals of time during predetermined signals of said discontinuous signals, and means responsive to the voltage produced by said sampling means for changing the frequency of said oscillator and causing said continuous signal to occur in fixed time-phase relation to the high frequency components of said discontinuous signals.

3. In combination, a source of recurrent pulse trains of high frequency alternating signals, a source of continuous high frequency alternating signals, a phase detector responsive to said recurrent and said continuous signals adapted to produce a direct current output voltage varying according to the phase relation between the alternating components of said recurrent high frequency signals and said continuous high frequency signals, sampling means for producing a voltage proportional to the direct current voltage produced by said phase detector during each sampling period, means responsive to said recurrent signals for deactivating said sampling means except at predetermined intervals of time during said recurrent signals, a large time-constant network connected across the output of said sampling means, and means responsive to the voltage developed across said network for causing said continuous signals to occur in fixed time-phase relation to the high frequency components of said recurrent signals.

4. In combination, a source of discontinuous high frequency signals, an oscillator for producing a continuous high frequency signal at substantially the same frequency as the frequency of said discontinuous signals, a phase shifter connected with the output of said oscillator, a phase detector responsive to said discontinuous signals and the phase-shifted signal of said oscillator, a sampling gate for producing a voltage proportional to the voltage produced by said phase detector, means responsive to said discontinuous signals for deactivating said sampling gate except at predetermined times during portions of said discontinuous signals, a large time-constant network connected across the output of said sampling gate, and means responsive to the voltage developed across said network for actuating said phase shifter and causing the phase-shifted signal of said oscillator to occur in fixed time-phase relation to the high frequency components of said discontinuous signals.

5. In combination, a source of discontinuous high frequency signals, an oscillator for producing a continuous high frequency signal at substantially the same frequency as the frequency of said discontinuous signals, a phase shifter connected with the output of said oscillator, a phase detector responsive to said discontinuous signals and the phase-shifted signal of said oscillator, a filter connected to the output of said phase detector for removing the high frequency components of the output of said phase detector, sampling means connected to the output of said filter for producing a voltage proportional to the voltage produced by said filter, means responsive to said discontinuous signals for deactivating said sampling means except at predetermined times during portions of said discontinuous signals, a large time-constant network connected across the output of said sampling means, means for amplifying the voltage produced across said network, and a motor responsive to the output of said amplifying means, said motor serving to actuate said phase shifter and cause the phase-shifted signal of said oscillator to occur in fixed time-phase relation to the high frequency components of said discontinuous signals.

6. In combination, a source of discontinuous pulse trains of high frequency alternating signals, an oscillator for producing a continuous high frequency alternating signal, a phase detector responsive to said discontinuous and said continuous alternating signals adapted to produce a direct current output voltage varying according to the phase relation between the alternating components of said recurrent high frequency signals and said continuous high frequency signals, sampling means for producing a voltage proportional to the direct current voltage produced by said phase detector during each sampling period, means responsive to said discontinuous signals for deactivating said sampling means except at predetermined times during portions of said discontinuous signals, a large time-constant network connected across the output of said sampling means, and a reactance tube circuit responsive to the voltage produced across said network for controlling the frequency of said oscillator and causing said continuous signal to occur in predetermined phase relation to the high frequency components of said discontinuous signals.

7. In combination, a source of recurrent high frequency signals, a source of continuous high frequency signals of the same frequency as said recurrent signals, a phase detector responsive to said recurrent and said continuous signals, a utilization circuit, two pairs of unilateral conductors, means interconnecting the anodes of the first pair of unilateral conductors, means interconnecting the cathodes of the second pair of unilateral conductors, a serially connected impedance and large time-constant network interconnecting said anodes and said cathodes, means connecting the cathode of one of said first pair of unilateral conductors and the anode of one of said second pair of unilateral conductors to the output of said phase detector, means connecting the cathode of the other unilateral conductor of said first pair and the anode of the other unilateral conductor of said second pair to said utilization circuit, and means responsive to said recurrent signals for generating recurrent pulses of voltage across said impedance during predetermined portions of said recurrent signals, said pulses being of a polarity to cause the anodes of said first pair of unilateral conductors to be of positive polarity with respect to the cathodes of said second pair of unilateral conductors.

8. In combination, first and second sources of high frequency signals of the same frequency, a phase detector responsive to said signals, a utilization circuit, two pairs of unilateral conductors, means interconnecting the anodes of the first pair of unilateral conductors, means interconnecting the cathodes of the second pair of unilateral conductors, a serially connected impedance and large time-constant network interconnecting said anodes and said cathodes, means connecting the cathode of one of said first pairs of unilateral conductors and the anode of one of said second pair of unilateral conductors to the output of stid phase detector, means connecting the cathode of the other unilateral conductor of said first pair and the anode of the other unilateral conductor of said second pair to said untilization circuit, and means for generating recurrent pulses of voltage across said impedance during predetermined portions of said signals, said pulses being of a polarity to cause the anodes of said first pair of unilateral conductors to be of positive polarity with respect to the cathodes of said second pair of unilateral conductors.

9. In combination, a source of recurrent pulse trains of high frequency alternating signals, means for producing a continuous high frequency alternating signal, a phase detector responsive to the high frequency recurrent signals and said continuous signal for producing an output voltage varying according to the phase relation between the high frequency alternating components of said recurrent and continuous high frequency signals, sampling means for producing an output voltage proportional to the output voltage produced by said phase detector, means for deactivating said sampling means except at predetermined intervals of time during said recurrent pulse trains of high frequency signals, and means responsive to the voltage produced by said sampling means for causing the high frequency alternating components of said recurrent and said continuous signals to occur in predetermined phase relation.

10. The combination as defined in claim 9 including a filter connected between the output of said phase detector and an input to said sampling means for removing the high frequency components of the output of said phase detector.

11. The combination as defined in claim 9 wherein said phase detector is adapted to produce a direct current voltage proportional to the cosine of the phase angle between the high frequency alternating components of said recurrent and continuous high frequency signals.

12. In combination, a source of recurrent pulse trains of high frequency alternating signals, means for generating a continuous high frequency alternating signal, a phase detector responsive to said recurrent and continuous signals for producing an output voltage varying according to the phase relation between the high frequency alternating components of said recurrent and continuous high frequency signals, a utilization circuit, a variable impedance device connected between the output of said phase detector and said utilization circuit, means for causing said variable impedance device to be of high impedance, and means responsive to said recurrent pulse trains of high frequency energy for causing said variable impedance device to be of low impedance for a brief interval of time during predetermined pulses of said recurrent pulse trains of high frequency signals, whereby a voltage proportional to the voltage produced by said detector may be produced during said brief interval of time and applied to said utilization circuit during each of said brief intervals of time.

13. In a system responsive to a series of recurrent alternating signals, generating means for producing a continuous alternating signal at a frequency substantially harmonically related to the frequency of said recurrent alternating signals, a phase detector connected to said generating means, said phase detector being responsive to said recurrent signals and said continuous signal and adapted to produce an output voltage varying according to the phase relation between the alternating components of said alternating signals, a sampling gate connected to the output of said phase detector and adapted to produce a voltage proportional to the voltage produced by said phase detector, means for deactivating said sampling gate except at predetermined intervals of time during said recurrent signals, and means responsive to the voltage produced by said sampling gate for causing the alternating components of said recurrent and said continuous signals to occur in predetermined phase relation.

References Cited in the file of this patent

UNITED STATES PATENTS

| | | |
|---|---|---|
| 2,408,079 | Labin et al. | Sept. 24, 1946 |
| 2,489,262 | Buckbee | Nov. 29, 1949 |